UNITED STATES PATENT OFFICE.

HENRY STALAY ARTHUR HOLT, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION.

HALOGENIZED INDIGO COMPOUNDS AND PROCESS OF MAKING SUCH BODIES.

1,042,679.  Specification of Letters Patent.  Patented Oct. 29, 1912.

No Drawing.   Application filed August 22, 1910.  Serial No. 578,377.

*To all whom it may concern:*

Be it known that I, HENRY STALAY ARTHUR HOLT, a subject of the King of England, residing at Ludwigshafen-on-the-Rhine, Germany, have invented new and useful Improvements in Halogenized Indigo Compounds and Processes of Making Such Bodies, of which the following is a specification.

The specification of the application for Letters Patent Serial No. 545,612 describes the production of halogenated dehydroindigo salts by causing halogen, or a compound which evolves halogen, to react on a salt of dehydroindigo or upon an indigo coloring matter itself, while carrying out the reaction in the presence of a compound which is capable of fixing halogen acid.

I have discovered that halogenated dehydroindigo salts can also be obtained by reacting on dehydroindigo, or a homologue, or substitution product, thereof, or on a salt of any of these compounds which is free from sulfur, with a sufficient quantity of halogen, or of a halogenizing agent, in the absence of any compound capable of fixing hydrochloric acid. Instead of dehydroindigo, the corresponding indigo coloring matter itself can be used, if the halogen or the halogenizing agent be allowed to react until the color of the indigo has entirely, or almost entirely, disappeared and the reaction mass has assumed a yellow to yellow-brown color in consequence of the formation of the dehydroindigo salt.

The following examples will serve to illustrate further the nature of my invention, which, however, is not confined to these examples. The parts are by weight.

Example 1: Pass chlorin into a suspension of nineteen parts of dehydroindigo acetate in one hundred parts of glacial acetic acid (preferably while cooling), until the suspension contains a canary yellow powder. Analysis points to this being trichlor-dehydroindigo acetate. From the solution, preferably after air has been blown through it in order to remove the excess of chlorin, a more highly chlorinated dehydroindigo acetate can be precipitated by means of water. If less chlorin be employed in this example, less highly chlorinated dehydroindigo acetates can be obtained. Instead of dehydroindigo acetate, derivatives thereof can be employed, for instance, from dibrom-dehydroindigo acetate there can be obtained in a similar manner dibrom-monochlor- and dibrom-dichlor-dehydroindigo acetate. In this example, instead of glacial acetic acid, other reagent, such for instance as acetic anhydrid, trichlorbenzene, nitrobenzene, or carbon tetrachlorid, can be employed.

Example 2: Pass chlorin into a suspension of thirteen parts of dehydroindigo in thirty parts of nitrobenzene until the brown color of the dehydroindigo has disappeared and a yellow crystalline powder is obtained. Filter this off and wash it with ether. It appears to be a mixture of trichlor- and tetrachlor-dehydroindigo-hydrochlorid. In this example, instead of nitrobenzene, other suspension agents can be employed.

Example 3: Pass chlorin into a suspension of thirteen parts of indigo in one hundred parts of nitrobenzene, while stirring and cooling somewhat, until the blue mass is replaced by a yellow-brown solution containing a light yellow precipitate. Allow this to stand for a short time, remove the excess of chlorin by blowing air through it, filter off the product, and wash it with ether. It appears to be trichlor-dehydroindigo hydrochlorid. The part of the product which remains in the nitrobenzene can be isolated in the form of the corresponding bisulfite compound by shaking the solution with a warm aqueous solution of bisulfite or sulfite.

Example 4: Suspend ten parts of 5.5'-dibromindigo in one hundred parts of glacial acetic acid and pass chlorin into the suspension until the indigo has disappeared. Dilute with water the yellow-brown solution, from which considerable quantities of monochlor- and dichlor-dibrom-dehydroindigo hydrochlorid have crystallized out. Filter off the precipitate, wash it, and dry it at a slightly elevated temperature. In this example, the 5.5'-dibromindigo can be replaced by other halogen indigos, such for instance as 6.6'-dichlorindigo and 4.4'-dichlorindigo. Further the glacial acetic acid can be replaced by acetic anhydrid or by a mixture of the said acid and anhydrid, or other organic agents can be used.

Example 5: Suspend ten parts of indigo in from fifty, to seventy-five, parts of acetyl chlorid and, while at a temperature of zero centigrade, pass in from twelve to fourteen parts of chlorin until the indigo has disappeared and a yellowish brown solution containing yellow crystals is obtained. The product can be worked up either by introducing it into a mixture of ether and water, or by distilling off the acetyl chlorid *in vacuo*. The product appears to be trichlor-dehydroindigo hydrochlorid. In this example, instead of acetyl chlorid, phosphorus oxychlorid, or other chlorid, such for instance as sulfuryl chlorid, can be employed. When sulfuryl chlorid is used, more highly chlorinated derivatives of dehydroindigo can be obtained containing for instance from seven to eight atomic proportions of chlorin, and these derivatives, on being converted into the corresponding indigo coloring matters, part with the loosely combined chlorin atoms and give rise to tetrachlorindigo.

Example 6: Suspend ten parts of indigo in seventy-five parts of carbon tetrachlorid and add, gradually, at ordinary temperature, eighty parts of sulfuryl chlorid. After stirring for about five hours, the mass commences to turn green and after another ten hours the whole consists of a brownish yellow solution from which considerable quantities of halogenated dehydroindigo hydrochlorid are separated out.

Now what I claim is:—

1. The process of producing halogenized indigo coloring matter by treating an indigo coloring matter with a halogenizing agent in the absence of a salt which combines with halogen hydrid and in the presence of an organic acid capable of yielding a salt with halogenized dehydroindigo, and then reducing the halogenized dehydroindigo coloring matter into the corresponding halogenized indigo coloring matter.

2. In the production of halogenized indigo coloring matter the process which consists in treating a dehydroindigo salt which is free from sulfur with a halogenizing agent in the absence of a salt which neutralizes halogen hydrid.

3. In the production of halogenized indigo coloring matter the process which consists in treating an indigo coloring matter with a halogenizing agent gives rise to halogen in the absence of a salt which combine with halogen hydrid and in the presence of an organic acid capable of yielding a salt with halogenized dehydroindigo.

4. In the production of halogenized indigo coloring matter the process which consists in treating a dehydroindigo salt which is free from sulfur with a halogenizing agent in the absence of a salt which neutralizes halogen hydrid and then reducing the halogenized dehydroindigo coloring matter into the corresponding halogenized indigo coloring matter.

5. In the production of halogenized indigo coloring matter the process which consists in treating indigo with a halogenizing agent in the absence of a salt which combines with halogen hydrid and in the presence of an organic acid capable of yielding a salt with halogenized dehydroindigo.

In testimony whereof I have hereunto set my hand in the presence of two subscribing witnesses.

ARTHUR HOLT.

Witnesses:
ERNEST G. EHRHARDT,
ERNEST L. IVES.